Dec. 27, 1949   J. ROSAN   2,492,536
THREAD LOCK FOR INSERTS
Filed Jan. 17, 1945
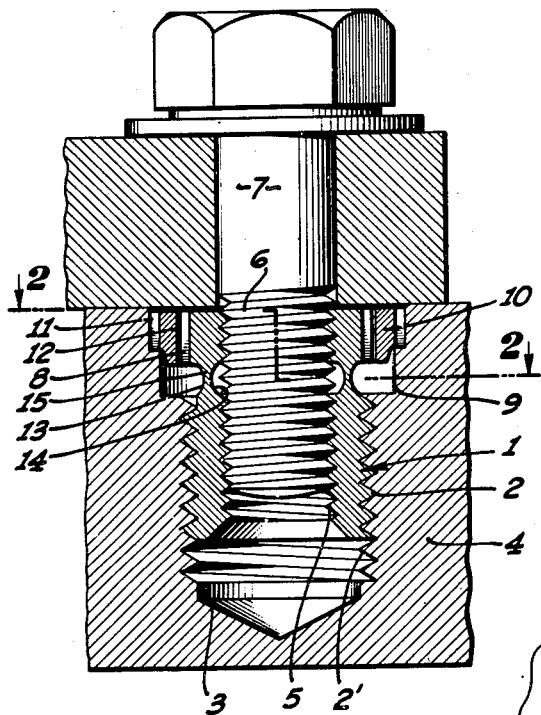
Fig. 1.
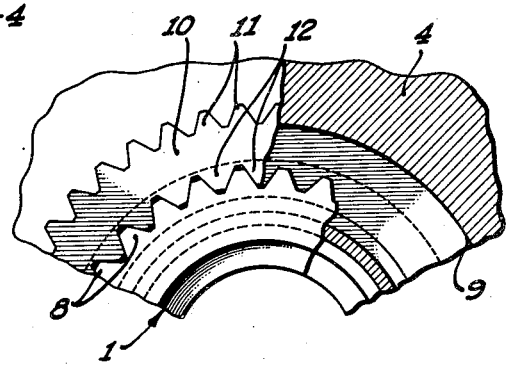
Fig. 2.
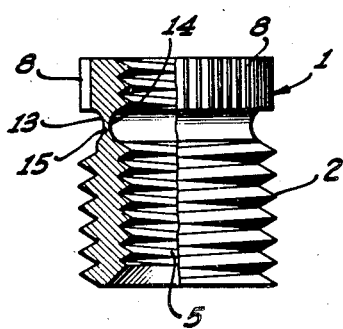
Fig. 3.
INVENTOR.
JOSEPH ROSAN,
BY
ATTORNEY.

Patented Dec. 27, 1949

2,492,536

UNITED STATES PATENT OFFICE 2,492,536

THREAD LOCK FOR INSERTS

Joseph Rosan, North Hollywood, Calif.

Application January 17, 1945, Serial No. 573,269

3 Claims. (Cl. 85—32)

This invention is concerned generally with inserts to be anchored in articles of such soft materials as are unable to directly take the stress imposed by making mechanical connection between such soft articles and other articles, as set forth in United States Patent No. 2,400,318, issued May 14, 1946 to Joseph Rosan for "Insert," filed November 25, 1942.

The present invention is more particularly concerned, however, with the problem of securing the mechanical connecter or fastener—such as a stud—in the insert in such manner as to preclude the loosening of the stud due to vibration or to analogous causes.

More definitely, it is the primary object of the invention to provide a construction and combination of parts, in such inserts as the Rosan inserts, whereby the stud, or an equivalent male fastener-element, will not only be precluded from imposing its loads directly upon the soft material by the insert, but will be securely locked by the insert itself and held in irrotational position therein, even when subjected to the most severe vibratory forces.

A particular object of the invention is to provide a stud-locking insert which, although embodying the advantages set forth above, will nevertheless be simple in nature and easy to install and use, yet economical to fabricate.

The other objects and features of the invention will be made manifest in, or become apparent from, the following description of the presently preferred embodiment of the invention, taken in conjunction with the accompanying drawings.

In the drawings mentioned:

Fig. 1 is a sectional view of two fragments of material united by means of a bolt and an insert constructed according to the invention the bolt being shown in elevation;

Fig. 2 is a fragmentary sectional view along line 2—2 of Fig. 1, sighting in the direction of the arrows; and Fig. 3 is an elevational view partly in section, of the improved insert-element of the present invention.

Essentially, the construction shown in the drawings includes an insert 1, fundamentally of the Rosan type alluded to, and comprising a hollow cylinder of hard metallic material, threaded on its exterior periphery as at 2, for engagement with complementary threads 2' formed in a bore 3 in the sheet or body of softer material 4, and threaded on its interior periphery as at 5, for engagement with the complementary threads 6, of a male fastener-element 7, in this instance a conventional stud. Preferably, the pitch of the threads 2 and 2' is greater than that of the threads 5 and 6, since the strength of the material 4 is much less than that of the insert and the male fastener-element.

As most clearly shown in Fig. 3, the entire periphery of the upper portion or head of the insert, is provided with a plurality of longitudinally extending splines or serrations 8; the bore for the insert is counterbored as at 9; and a locking ring 10, having a plurality of splines or serrations 11 occupying its entire exterior periphery and a plurality of splines or serrations 12 occupying its entire interior periphery, is provided. The root diameter of the locking ring exterior splines corresponds exactly with the maximum diameter of the counterbore 9, so that upon aligning the interior splines of the locking ring with the splines of the insert and broaching the exterior splines of the ring into the wall of the counterbore, and sinking the ring flush or sub-flush with the surface of the soft sheet, the insert is immobilized against rotation.

As shown best in Fig. 3, the wall of the insert, preferably just below the splined head thereof, and in immediate juxtaposition therewith, is provided with radially aligned exterior and interior annular grooves 13 and 14 whereby the insert is thinned to an extent sufficient to provide resiliency or elastic deformability thereat, but not to such an extent as to seriously weaken the insert. In the course of its manufacture, the insert is axially compressed beyond the elastic limit of the material in the neck portion 15 to produce a slight permanent "set" reducing the spacing between the two groups of threads by a predetermined amount, for example, in the order of from .005 to .007 of an inch—a distance too small to be feasibly illustrated in drawings made on the present scale.

This deformation in the thinned wall portion 15 of the insert has the effect of throwing the interior threads in the splined-head portion of the bore of the insert slightly out of phase with those in the remainder of the bore. Consequently, when the stud is screwed into the head and into pressure contact with the threads in the body portion, the head is displaced upwardly slightly, the head sliding in its splined connection with the locking ring but restrained from rotation. When the head has raised sufficiently to return the thread to an "in-phase" relation (less whatever clearance or tolerance is provided) the stud enters the threads of the body portion. The neck portion 15, however, acts as a spring to maintain a load on the threads of the stud which is independent of the load imposed by tightening of the stud. The amount of displacement of the head portion may be extremely small, merely enough to impose the necessary frictional contact without play.

It is to be understood that this locking action begins when the first thread on the lower end of the bolt engages the first thread on the insert lying just below the thinned wall section 15, which is located just below the head of the insert. This is a feature of advantage, since it gives substantial assurance that even a relatively short stud screwed into the insert will encounter the locking action of the device.

The thinned wall section 15 can, it is to be understood, be formed and defined in other ways than by the radially aligned annular grooves shown, the prime concept including all means for setting up a permanent axial-thrust resisting compressive stress, or deformation, between the interrupted threads in the head portion and in the shank portion of the insert.

I claim:

1. An internally threaded insert structure for a threaded stud or the like, adapted for installation in a threaded and counterbored socket, said insert comprising: a body member; a head at one end thereof; an externally threaded shank at the other end thereof; a superficially flexible unthreaded connecting portion joining said shank and head; said shank and head having identical internal threaded formations spaced from one another by said connecting portion and movable between out-of-phase and in-phase relation by axial displacement of said head relative to said shank accompanied by flexure in said connection portion; said head having axially directed locking elements; and a locking ring having external locking elements adapted to be embedded in said counterbore and having internal elements for mating with said locking elements on said head for restraining said head against rotation but permitting axial displacement thereof relative to said body member.

2. An internally threaded insert structure for a threaded stud or the like, adapted for installation in a threaded and counterbored socket, said insert comprising: a coaxial tubular body member and head member; an unthreaded axially yieldable web of reduced wall thickness joining said members and entirely confined within the diameter of said members; external threads for said body member; external axial serrations for said head member; a locking ring having external locking serrations adapted to be embedded in said counterbore and having internal serrations for mating with said serrations on said head to permit axial displacement of said head but prevent rotation thereof; said head and body members having identical internal coaxial and out-of-phase related thread formations spaced from one another by said web.

3. An internally threaded insert structure for a threaded stud or the like adapted for installation in a threaded and counterbored socket, said insert comprising: a tubular element having an unthreaded semi-flexible web of reduced diameter to enter a socket admitting said tubular element and dividing said element into a head and a body portion; said head and body portion having identical internal out-of-phase related thread formations spaced from one another by said web; said body member being externally threaded to fit said socket; and means adapted to be anchored in said counterbore and interlocking with said head member to resist torsional forces but permit axial movement of said head thereby to change the phase relationship of said internal threads.

JOSEPH ROSAN.

REFERENCES CITED

The following references are of record in the file of this patent:

UNITED STATES PATENTS

| Number | Name | Date |
|---|---|---|
| 2,002,741 | Hunt | May 28, 1935 |
| 2,196,637 | Luce | Apr. 9, 1940 |
| 2,203,219 | Jackman | June 4, 1940 |
| 2,371,927 | Schmidt | Mar. 20, 1945 |
| 2,395,063 | Paulus | Feb. 19, 1946 |
| 2,400,318 | Rosan | May 14, 1946 |